United States Patent [19]

Schmidt et al.

[11] Patent Number: 4,702,689
[45] Date of Patent: Oct. 27, 1987

[54] SIDE MOUNTED MANIFOLD BLOCK FOR VARIABLE ORIENTATION OF INJECTION MOLDING NOZZLE

[75] Inventors: Harald H. Schmidt, Georgetown; Rory McDowall, Acton, both of Canada

[73] Assignee: Mold-Masters Limited, Georgetown, Canada

[21] Appl. No.: 941,828

[22] Filed: Dec. 15, 1986

[30] Foreign Application Priority Data

Dec. 1, 1986 [CA] Canada ................................. 524208

[51] Int. Cl.[4] ............................................. B29C 45/22
[52] U.S. Cl. .................................. 425/548; 264/328.8; 264/328.15; 425/549; 425/564; 425/568; 425/570; 425/571; 425/573
[58] Field of Search ............... 425/548, 549, 562, 563, 425/564, 568, 570, 571, 572, 573, 542; 264/328.1, 328.8, 328.15

[56] References Cited

U.S. PATENT DOCUMENTS

| 3,671,159 | 6/1972 | Greenberg et al. | 425/573 |
|---|---|---|---|
| 4,276,014 | 6/1981 | Aoki | 425/570 |
| 4,468,191 | 8/1984 | Gellert | 425/564 |
| 4,579,520 | 4/1986 | Gellert | 425/549 |
| 4,599,064 | 7/1986 | Landis et al. | 425/549 |

Primary Examiner—Jay H. Woo
Assistant Examiner—Timothy W. Heitbrink
Attorney, Agent, or Firm—Riches, McKenzie & Herbert

[57] ABSTRACT

This invention relates to a valve gated injection molding system in which melt flows through an elongated manifold to a number of spaced nozzles to fill a single non-linear cavity. Each nozzle is mounted against a manifold offset block which is bolted to the side of the manifold. Pressurized melt from the manifold flows through a melt duct in each manifold block and through the central bore of the respective nozzle to a gate into the cavity. Actuating mechanism is mounted to reciprocate a valve pin extending through each manifold block and nozzle. Each manifold offset block can be mounted with a different orientation on the side of the manifold to properly space the gates along the non-linear cavity to ensure it completely fills as quickly as possible. Slight lateral movement of each manifold block relative to the manifold is permitted to avoid melt leakage due to misalignment of the nozzles as a result of thermal expansion of the manifold.

6 Claims, 4 Drawing Figures

SIDE MOUNTED MANIFOLD BLOCK FOR VARIABLE ORIENTATION OF INJECTION MOLDING NOZZLE

BACKGROUND OF THE INVENTION

This invention relates to injection molding and more particularly to heated manifold blocks which are mounted on the side of an elongated manifold to offset the nozzles relative to the manifold for injecting through several gates to a single non-linear cavity.

There is a rapidly increasing demand for the use of injection molding to make large components, particularly in the automotive industry. It is well known to connect several nozzles to a single elongated manifold to provide the considerable melt volume and short melt flow distances necessary to satisfactory fill a large cavity. In the past, these nozzles have been mounted in parallel alignment to extend forward from the forward face of the elongated manifold. While this is satisfactory for many applications, if the part is curved or otherwise substantially non-linear, it may be desirable for melt flow characteristics to locate the nozzles and gates with different orientations relative to each other. While different orientations of the various nozzles can be achieved by making the manifold with different portions of the forward face at different angles, this is not satisfactory due to melt leakage. If nozzles having different orientations are fixed to the forward face of a manifold, longitudinal thermal expansion of the manifold causes misalignment of the nozzles resulting in leakage of the pressurized melt.

SUMMARY OF THE INVENTION

It is an object of the present invention to at least partially overcome these disadvantages by mounting each nozzle against a manifold offset block which is bolted with the desired orientation to the side of the manifold to permit slight lateral movement between them.

To this end, in one of its aspects, the invention provides an injection molding system having an elongated manifold and a plurality of nozzles, the manifold having a longitudinal melt bore extending from an inlet to a plurality of outlet bores, each outlet bore leading to an outlet on a common surface of the manifold, each nozzle being seated in a cavity plate and having a central bore with an inlet and an outlet in alignment with a gate leading to a common cavity, an elongated valve pin having a driven end and a tip end being mounted in the central bore of each nozzle, the driven end of the valve pin being operatively connected to valve pin actuating mechanism whereby the valve pin is reciprocated between a retracted open position and a closed position wherein the tip end of the valve pin is seated in a respective gate, having the improvement wherein the outlet bores in the manifold extend laterally from the longitudinally bore and the outlets are on a side surface of the manifold, a plurality of spaced manifold offset blocks are secured to the side surface of the manifold, each manifold block having an inlet surface and an outlet surface with a melt duct extending therebetween, the melt duct having an inlet on the inlet surface and an outlet on the outlet surface, the inlet surface of each manifold block being secured with a predetermined orientation to the side surface of the manifold with the inlet in alignment with one of the outlets from the manifold, the outlet surface of each manifold block having one of the nozzles secured thereagainst with the melt duct outlet in alignment with the inlet to the central bore of the nozzle, each manifold block also having a straight valve pin bore with a first portion and a larger diameter second portion extending therethrough, the first portion of the valve pin bore having a diameter to snugly receive a respective valve pin therethrough, the second portion of the valve pin bore being equal in diameter to the central bore of the nozzle and extending to the outlet on the outlet surface in alignment with the central bore of the nozzle, the melt duct extending through each manifold block from the inlet surface joining the enlarged second portion of the valve pin bore and having a smoothly curved bend whereby the nozzle secured against the manifold block is laterally offset relative to the manifold, the inlet surfaces of the manifold block being secured to the side surface of the manifold to allow slight lateral movement therebetween to provide for thermal expansion of the manifold.

Further objects and advantages of the invention will appear from the following description, taken together with the accompanying drawings.

DETAILED DESCRIPTION OF THE DRAWINGS

Figure 1:
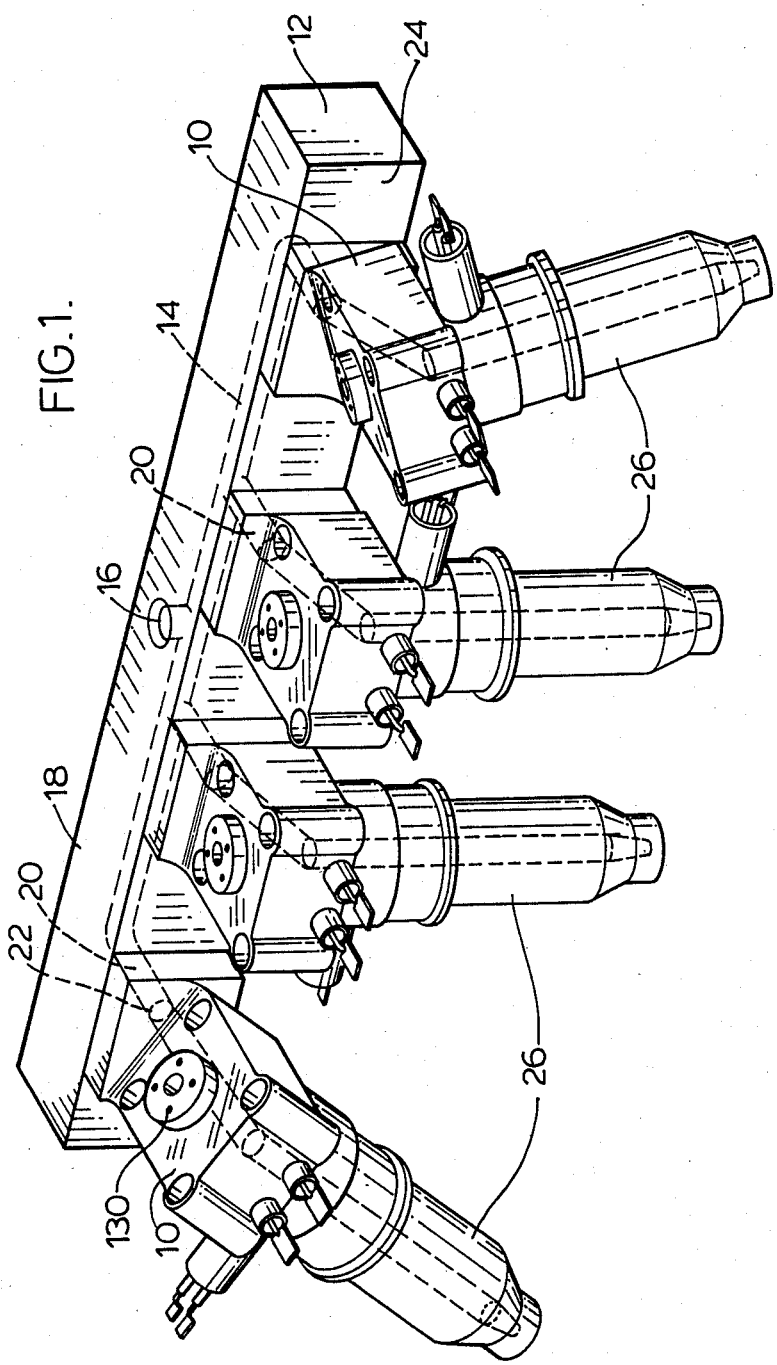
FIG. 1 is an isometric view showing a portion of a valve gated injection molding system having a number of nozzles, each mounted against a manifold offset block according to a preferred embodiment of the invention.
Figure 2:
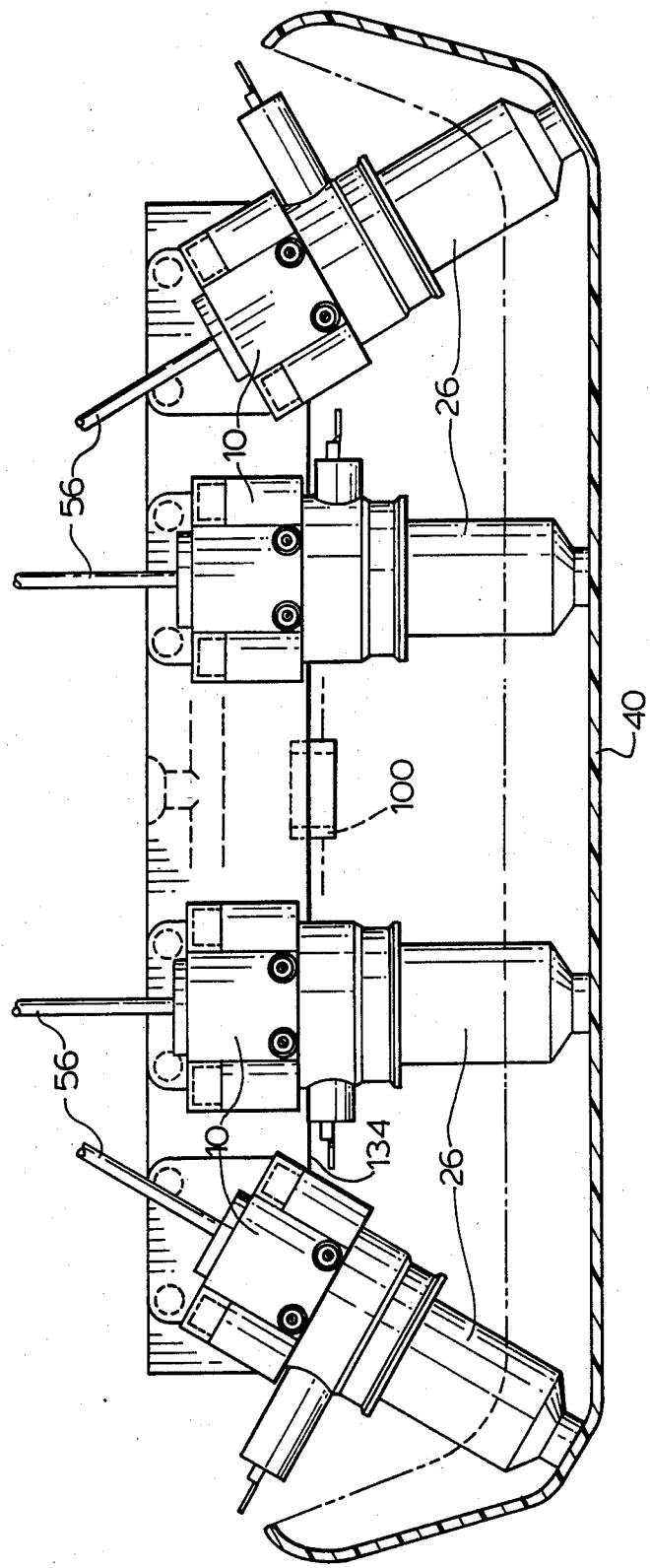
FIG. 2 is an elevation view clearly showing the orientation of the nozzles seen in FIG. 1.
Figure 3:
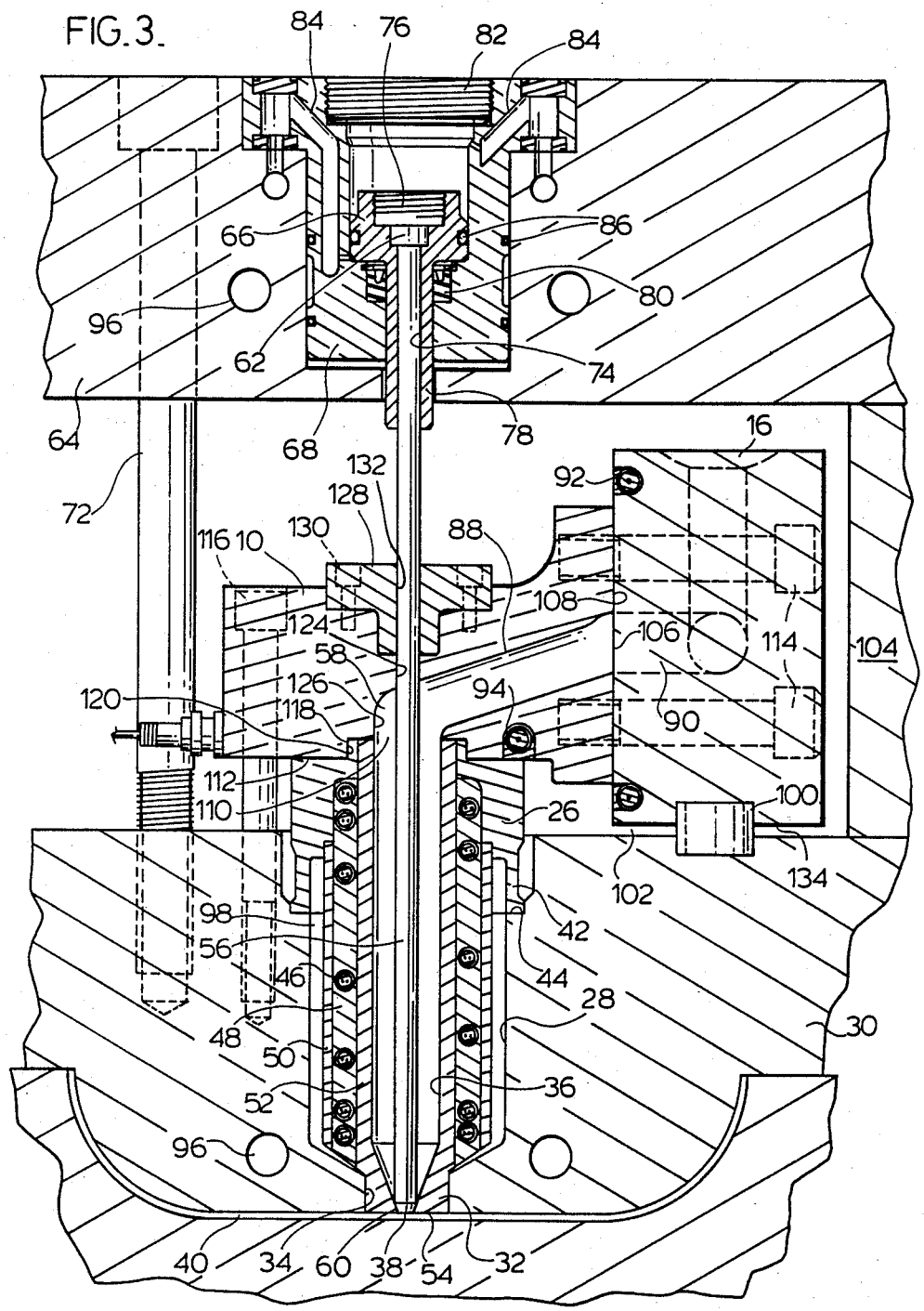
FIG. 3 is a cross sectional view showing one of the nozzles and manifold blocks in FIG. 1.

Reference is first made to FIGS. 1 and 2 which show a portion of a valve gated injection molding system having a number of manifold offset blocks 10 secured to an elongated manifold 12 according to a typical embodiment of the invention. The manifold 12 has a longitudinal melt bore 14 which connects a central inlet 16 on the rear surface 18 to a number of outlet bores 20, each of which leads to an outlet 22 on a side surface 24 of the manifold 12. As can be seen in FIG. 3, a heated nozzle 26 which is seated in a well 28 in a cavity plate 30 is securely mounted against each of the manifold block 10. Each nozzle 26 has a nose portion 32 which extends through a cylindrical opening 34 in the cavity plate 30. Each nozzle 26 has a central bore 36 which extends to a gate 38 through the nose portion 32. The gates 38 all lead to a single large non-linear cavity 40, and the manifold blocks 10 are mounted with different orientations on the side surface 24 of the manifold 12 so that the gates 38 are properly spaced along the cavity 40 to ensure it completely fills as quickly as possible. Normally the gates are equally spaced with a maximum melt flow distance in the cavity which is calculated depending upon the melt viscosity and the cavity dimensions.

Each nozzle 26 has a locating bushing portion 42 which is seated against a circumferential shoulder 44 around the well 28 to accurately locate it in place. The nozzles 26 are made by the method described in Gellert Canadian patent application Ser. No. 496,645 entitled "Manufacturing Method for Selected Gate Configuration Injection Molding Nozzles" filed Dec. 2, 1985.

Each nozzle 26 has a helical electrical heating element 46 which is cast in a copper portion 48 between a stainless steel outer portion 50 and a stainless steel inner portion 52 which forms the central bore 36. In this embodiment, each nozzle 26 has a nose portion 32 which is snugly received in the opening 34 in the cavity plate 34, as described in U.S. Pat. No. 4,579,520 to Gellert which issued Apr. 1, 1985. If appropriate, the forward face 54 of the nose portion 32 can be machined on an angle to align it with the cavity 40.

As also seen in FIG. 3, an elongated valve pin 56 is located in the central bore 36 of each nozzle 26 and extends through a valve pin bore 58 through the manifold block 10 against which the nozzle 26 is mounted. Each valve pin 56 has a tapered tip end 60 and an enlarged driven end 62 which is engaged by a hydraulic actuating mechanism seated in the hydraulic or mold back plate 64. As described in U.S. Pat. No. 4,468,191 to Gellert which issued Aug. 28, 1984, the actuating mechanism includes a piston 66 which reciprocates in a cylinder 68 seated in the mold back plate 64. The cylinder is fixed in the mold back plate 64 by bolts (not shown) and the mold back plate is held securely by bolts 72 which extend into the cavity plate 30. The valve pin 56 extends through a hole 74 in the piston 66 and is secured to it by a threaded plug 76 which screws into the piston 66 and also seals against leakage of the hydraulic fluid. The piston has an elongated neck portion 78, and a V-shaped high temperature seal 80 is seated in the cylinder 68 to prevent leakage of pressurized hydraulic fluid around it. The cylinder 68 has a threaded cap 82 which is larger in diameter than the piston 66 so that the piston 66 and valve pin 56 can be removed if necessary. Pressurized hydraulic fluid is supplied to the cylinder 68 on opposite sides of the piston 66 through ducts 84 from a controlled source (not shown) to reciprocate the piston according to a predetermined cycle. In the forward closed position the valve pin tip end 60 is sealed in the gate 38, while in the retracted open position the piston abuts against the cap 82. O-rings 86 are also provided to prevent leakage of the pressurized hydraulic fluid around the piston 66 and the cylinder 68.

As described in more detail below, each manifold block 10 has a melt duct 88 extending therethrough. These melt ducts 88 each form a portion of the melt passage 90 through which the pressurized melt flows from the central inlet 16 to the various gates 38 into the cavity 40. The melt passage 90 branches in the manifold 12 and extends through the melt duct 88 of each of the manifold blocks 10 and the central bore 36 of the nozzle 26 mounted against it As is well known, it is critical to successful operation of the system that the temperature of the melt is maintained within a narrow range as it flows through the melt passage 90. Thus, each nozzle 26 is heated by the electrical heating element 46, and the manifold is heated by an electrical heating element 92 which is cast into it as described in Canadian Pat. No. 1,174,020 to Gellert which issued Sept. 11, 1984. Another electrical heating element 94 is similarly cast into each of the manifold blocks 10 and the operating temperatures are controlled within a predetermined range by a temperature controller (not shown). It is also necessary to cool the mold back plate 64 and the cavity plate 30, and cooling water is pumped through cooling conduits 96 for this purpose. In order to reduce heat loss, an insulative air space 98 is provided between each heated nozzle 26 and the surrounding cavity plate 30. Similarly, the manifold 12 is positioned by locating ring 100 with another insulative air space 102 separating the heated manifold 12 and manifold block 10 from the surrounding cavity plate 30, mold back plate 64 and manifold plate 104.

Figure 4:
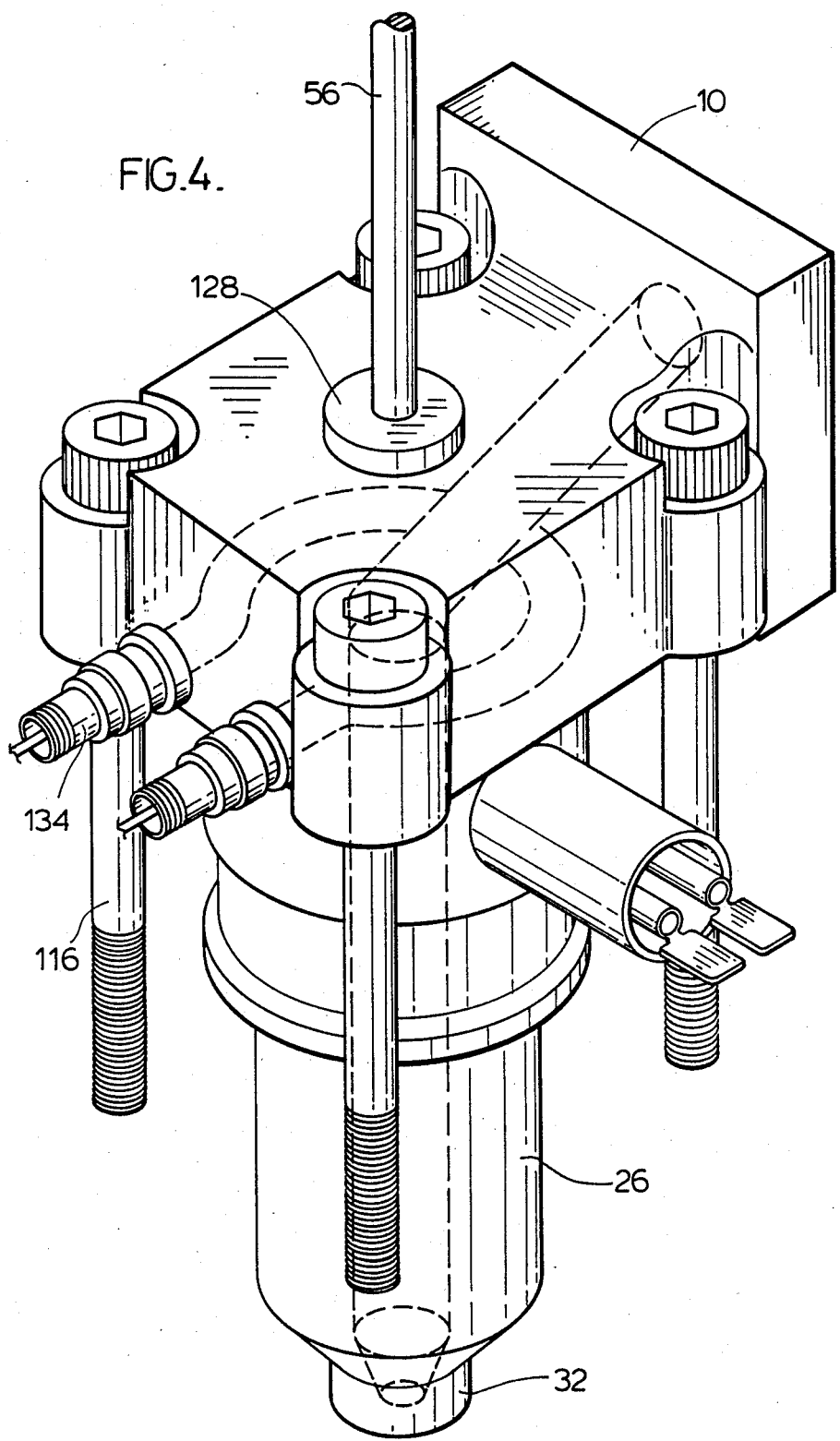
FIG. 4 is an isometric view of one of the nozzles and manifold blocks seen in FIG. 1.

The manifold offset blocks 10 shown according to a preferred embodiment of the invention will now be described in more detail with particular reference to FIGS. 3 and 4. As mentioned above, each manifold block 10 has a melt duct 88 extending therethrough. The melt duct 88 has an inlet 106 which is on an inlet surface 108, and an outlet 110 which is on an outlet surface 112. Each manifold block 10 is secured to the manifold 12 in a predetermined orientation by bolts 114 which extend through the manifold into the block. The inlet surface 108 of each block abuts against the side surface 24 of the manifold, with the melt duct inlet 106 in alignment with a respective outlet 22 from the manifold 12. While the bolts 114 hold each block 10 against the side surface 24 of the manifold 12 tightly enough to prevent leakage of the melt, they do permit slight lateral movement therebetween to accommodate thermal expansion and contraction of the manifold to avoid leakage due to misalignment of the nozzle, as described below. As described above, each nozzle 26 is seated against the circumferential shoulder 44 in a well 28 in the cavity plate 30. The nozzle 26 is held securely in this position by a manifold block 10 which is mounted tightly against it by bolts 116 which extend into the cavity plate 30. As can be seen, the nozzle 26 has a protruding central portion 118 which extends into a seat 120 in the outlet surface 112. Thus, the nozzle is securely mounted against the outlet surface 112 of the manifold block 10 with the melt duct outlet 110 in alignment with the central bore 36 of the nozzle 26.

Each manifold block 10 also has a straight valve pin bore 58 extending therethrough in alignment with the central bore 36 through the nozzle 26 secured against it. The valve pin bore 58 has a first portion 124 which snugly receives the valve pin 56 therethrough and an enlarged second portion 126 which extends to the outlet surface 112 and is aligned with and equal in diameter to the central bore 36 of the nozzle 26. As can be seen, the melt duct 88 extending through each manifold block 10 from the inlet surface 108 to the outlet surface 112 has a smoothly curved bend whereby it joins the second portion 126 of the valve pin bore and extends to the common outlet 110 on the outlet surface 112. Thus, the pressurized melt from the manifold 12 flows through the melt duct 88 in each manifold block, while the close fit between the valve pin 56 and the first portion 124 of the valve pin bore 58 prevents leakage of the pressurized melt around the reciprocating valve pin. In this embodiment, each manifold block 10 has a sealing bushing 128 secured to it by screws 130. The bushing 128 is seated in the manifold block 10 and has a central bore 132 which also snugly receives the valve pin 56 therethrough to prevent the leakage of melt around the reciprocating valve pin. The bushings 128 and the manifold blocks 10 are made of a tool steel, such as H13, and the central bores 132 of the bushing and the first portions 124 of the valve pin bores 58 through the blocks are nitrided to reduce wear.

In use, the system is assembled as shown and described above with each nozzle 26 accurately seated in one of the wells 28 in the cavity plate 30 in alignment with the cylindrical opening 34 in the cavity plate. Electrical power is applied to heat the manifold 12, manifold blocks 10 and nozzle 26 to a predetermined operating temperature. This considerable increase in temperature causes thermal expansion of the elongated manifold 12. While bolts 116 securely held each manifold block 10 and nozzle 26 in the aligned position, bolts 114 allow slight lateral movement between the inlet surface 108 of the manifold block 10 and the side surface 24 of the manifold 12 to accommodate the longitudinal movement of the manifold due to thermal expansion. If the nozzles were mounted with the required different orientations on the forward face 134 of the manifold, the longitudinal thermal expansion of the manifold 12 would necessarily tilt some of the nozzles causing leakage due to misalignment. Laterally offsetting the nozzles 26 from the manifold 12 with the provision for slight lateral movement between them overcomes this problem.

Pressurized melt is then introduced into the melt passage 90 by a molding machine (not shown) positioned at the central inlet 16 to the manifold 12. Melt pressure is controlled according to a predetermined cycle in conjunction with the application of controlled hydraulic pressure through the hydraulic ducts 84 to the actuating mechanism, in a conventional manner. With the valve pins 56 in the retracted open position, the melt flows through the gates 28 and fills the cavity 40. After the cavity is full, injection pressure is held momentarily to pack and hydraulic pressure is then applied to drive the pistons 66 and valve pins 56 to the forward closed position with the tip end 60 of each valve pin 56 seated in one of the gates 38. The injection pressure is then released and this position is held for a short cooling period before the mold is opened for ejection. After ejection, the mold is closed and hydraulic pressure reapplied to draw the valve pin 56 to the retracted open position. Melt injection pressure is reapplied to refill the cavity, and the molding cycle is repeated continuously every few seconds depending on the size and shape of the cavity and the type of material being molded.

While the description of the manifold offset block and method of making it has been given with respect to preferred embodiments, it is not to be construed in a limiting sense. Variations and modifications will occur to those skilled in the art. For example, the size and non-linear shape of the cavity 40 may require the use of sub-manifolds connected to a main manifold to provide the necessary configuration. In that case, the offset blocks will be attached to the sub-manifolds instead of or in addition to the main manifold, depending upon the configuration. Reference is made to the appended claims for a definition of the invention.

What we claim is:

1. In an injection molding system having an elongated manifold and a plurality of nozzles, the manifold having a longitudinal melt bore extending from an inlet to a plurality of outlet bores, each outlet bore leading to an outlet on a common surface of the manifold, each nozzle being seated in a cavity plate and having a central bore with an inlet and an outlet in alignment with a gate leading to a common cavity, an elongated valve pin having a driven end and a tip end being mounted in the central bore of each nozzle, the driven end of the valve pin being operatively connected to valve pin actuating mechanism whereby the valve pin is reciprocated between a retracted open position and a closed position wherein the tip end of the valve pin is seated in a respective gate, the improvement wherein;

the outlet bores in the manifold extend laterally from the longitudinally bore and the outlets are on a side surface of the manifold, a plurality of spaced manifold offset blocks are secured to said side surface of the manifold, each manifold offset block having an inlet surface and an outlet surface with a melt duct extending therebetween, the melt duct having an inlet on the inlet surface and an outlet on the outlet surface, the inlet surface of each manifold offset block being secured with a predetermined orientation to said side surface of the manifold with the inlet in alignment with one of the outlets from the manifold, the outlet surface of each manifold offset block having one of the nozzles secured thereagainst with the melt duct outlet in alignment with the inlet to the central bore of the nozzle, each manifold offset block also having a straight valve pin bore with a first portion and a larger diameter second portion extending therethrough, the first portion of the valve pin bore having a diameter to snugly receive a respective valve pin therethrough, the second portion of the valve pin bore being equal in diameter to the central bore of the nozzle and extending to the outlet on the outlet surface in alignment with the central bore of the nozzle, the melt duct extending through each manifold offset block from the inlet surface joining the enlarged second portion of the valve pin bore and having a smoothly curved bend whereby the nozzle secured against the manifold offset block is laterally offset relative to the manifold, the inlet surfaces of the manifold offset block being secured to the side surface of the manifold to allow slight lateral movement therebetween to provide for thermal expansion of the manifold 2. An injection molding system as claimed in claim 1 wherein the manifold offset blocks are secured to the manifold by bolts.

3. An injection molding system as claimed in claim 2 wherein the inlet and outlet surfaces of each manifold offset block are at an angle of greater than 45° relative to each other.

4. An injection molding system as claimed in claim 2 wherein a sealing bushing is securely seated in each manifold offset block, each bushing having a central bore which snugly receives a respective valve pin therethrough whereby substantial leakage of pressurized melt around the reciprocating valve pin is prevented.

5. An injection molding system as claimed in claim 2 wherein the inlet and outlet surfaces of each manifold offset block are substantially perpendicular relative to each other.

6. An injection molding system as claimed in claim 1, 2 or 4 wherein each manifold offset block has an electrical heater cast into it to maintain each said manifold offset block within a predetermined temperature range.

* * * * *